United States Patent [19]

Yumde et al.

[11] 4,292,652
[45] Sep. 29, 1981

[54] METHOD OF RECEIVING A VIDEO SIGNAL

[75] Inventors: Yasufumi Yumde; Takashi Furuhata, both of Yokohama, Japan

[73] Assignee: Hitachi, Ltd., Tokyo, Japan

[21] Appl. No.: 905,524

[22] Filed: May 12, 1978

[30] Foreign Application Priority Data

May 13, 1977 [JP] Japan .................................. 52-54303

[51] Int. Cl.³ .............................................. H04N 7/12
[52] U.S. Cl. .................................... 358/138; 358/134
[58] Field of Search .............. 358/133, 138, 134, 135, 358/140, 146, 93

[56] References Cited

U.S. PATENT DOCUMENTS

| | | | |
|---|---|---|---|
| 2,810,780 | 10/1957 | Loughlin | 358/138 |
| 2,921,124 | 1/1960 | Graham | 358/138 |
| 3,136,847 | 6/1964 | Brown | 358/133 |
| 3,372,228 | 3/1968 | Law | 358/138 |
| 3,663,749 | 5/1972 | Cannon | 358/138 |
| 3,919,716 | 11/1975 | Yumde et al. | 358/134 |
| 3,950,607 | 4/1976 | Southworth et al. | 358/134 |
| 3,982,063 | 9/1976 | Brown et al. | 358/134 |
| 4,053,931 | 10/1977 | Hawkins et al. | 358/133 |

FOREIGN PATENT DOCUMENTS 2219259 11/1973 Fed. Rep. of Germany ...... 358/138

OTHER PUBLICATIONS

Still Picture Transmission Apparatus by Pom Sys.-Nat. Meeting of Inst. of Television Engs. of Japan, 1976, p. 271, 15-5.
Cassette Picture Recording System-IEEE Tokyo Section, Denshi Tokyo, 1975, pp. 16-18.

Primary Examiner—Joseph A. Orsino, Jr.
Attorney, Agent, or Firm—Craig and Antonelli

[57] ABSTRACT

In receiving a narrow band video signal transmitted through a narrow band transmission line such as a telephone line, a sound tape recorder or the like, the narrow band video signal is first stored in memories and is then read out therefrom at a higher reading-out speed than the writing-in speed so that the band allocated to the read-out signal is broadened to facilitate the display of the video signal. When reading out the video signal from the memories, the timing of reading out even lines constituting a display image of the video signal is shifted from the timing of reading out odd lines constituting the same display image by a time substantially equal to half the reciprocal of the frequency in terms of the bandwidth of the read-out video signal, the reciprocal corresponding to the resolution limit for the received video signal.

17 Claims, 11 Drawing Figures

METHOD OF RECEIVING A VIDEO SIGNAL

LIST OF THE PRIOR ART REFERENCES (37CFR 1.56(a))

The following references are cited to show the state of the art:
1. Still Picture Transmission Apparatus by PDM System
   In National Meeting of the Institute of Television Engineers of Japan, 1976, p. 271, 15-5
2. Cassette Picture Recording System
   IEEE Tokyo Section, Denshi Tokyo, 1975 p. 16 to 18.

BACKGROUND OF THE INVENTION

This invention relates to a method of receiving a video signal especially a narrow band video signal transmitted through a narrow band transmission line such as a telephone line, a sound tape recorder or the like.

In transmitting or recording-reproducing a so-called wide band video signal of a standard broadcasting system through the use of a narrow band transmission line such as a telephone line, a sound type recorder or the like, it is a practice to store the video signal temporarily in a clock controlled memory and to read out the stored video signal at a selected reading-out speed i.e., at a selected frequency of the reading-out clock signals in order that the stored video signal is converted into a video signal of a given allocation band. For storing the wide band video signal, the memory is required to have a capacity or a number of cells sufficient to store allotted picture elements composing the video signal. Considering the storage of a video signal of a 4.5 MHz bandwidth, for instance, the maximum number of picture elements is 4.5 MHz×2=9 M dots/sec and hence the number of cells amounts to (9 M dots/sec×1/30 sec)/frame=300 K dots/frame. If these picture elements are transmitted through a transmission line having a 3 KHz transmission bandwidth, it takes, for one frame, (4.5 MHz/3 KHz×1/30 sec)/frame≈50 sec/frame.

SUMMARY OF THE INVENTION

This invention contemplates an improvement in a method of receiving a narrow band video signal transmitted through a narrow band transmission line such as a telephone line, a sound tape recorder or the like, and has its object to provide an improved method of receiving the video signal which can reduce the memory capacity without impairing quality of reproduced images.

DESCRIPTION OF THE PREFERRED EMBODIMENTS

Figure 1A:
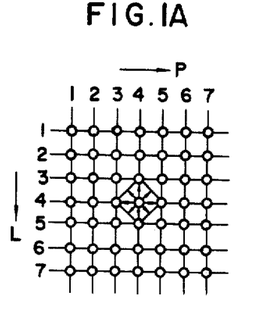
FIGS. 1A, 1B and 1C are diagrammatic representations showing resolution distances in various picture element arrangements of reproduced images.
Figure 1B:
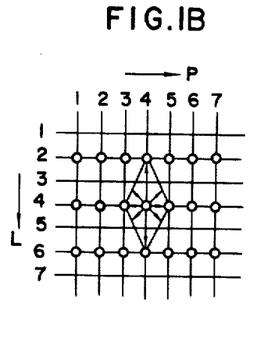
Figure 1C:
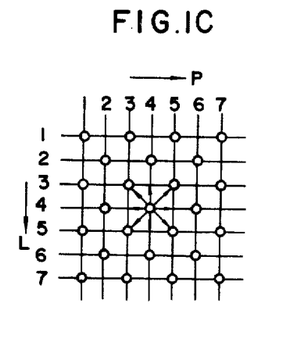

Referring to FIGS. 1A, 1B and 1C illustrating basic types of picture element arrangements of reproduced images, it is noted that the shorter the resolution distance, the higher is the obtainable resolution. Specifically, FIG. 1A shows an arrangement of a frame type in which picture elements are arranged at intersections of horizontal picture element axes P and vertical line axes L and horizontal, vertical and oblique resolution distances are shown by arrows. FIG. 1B shows an arrangement of a field type in which picture elements are arranged at intersections of horizontal picture element axes P and alternate horizontal line axes L, reducing the number of picture elements employed to half the number of picture elements of FIG. 1A but the vertical resolution distance is as long as twice that of FIG. 1A, considerably degrading the quality of the image. FIG. 1C shows an arrangement of an interleaved type with which a first aspect of the invention is concerned. In the last type, picture elements are associated with the horizontal picture element axes P with a reduction in number to half that of FIG. 1A and picture elements are so associated with the vertical line axes L as to be staggered alternately. With the arrangement of FIG. 1C, the oblique resolution distance is doubled as compared to FIG. 1A but the horizontal and vertical resolution distances are the same as FIG. 1A.

Figure 2:
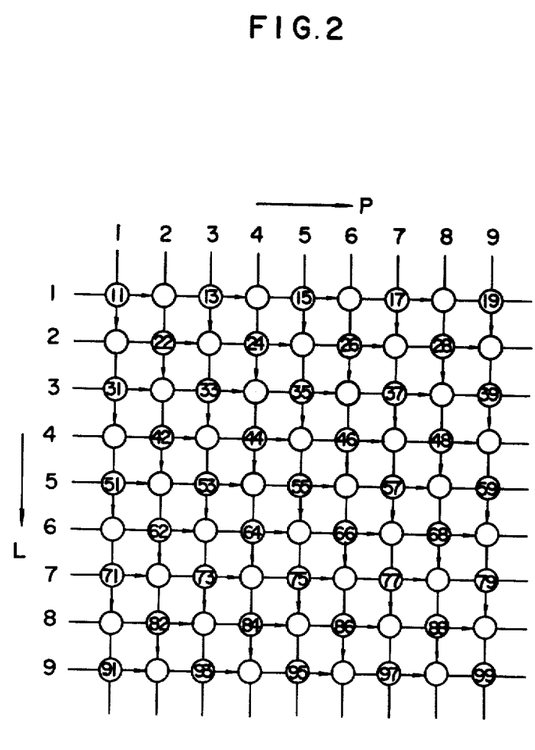
FIG. 2 is a diagrammatic representation showing a dot-interleaved type picture element arrangement that embodies the invention.

In view of the fact that the sense of sight is anisotropic and sensitivity to contrast in the oblique direction is lower than that in the horizontal and vertical directions, as disclosed in an article entitled "The sense of sight and television" by Kenji Hiwatari issued by Nippon Hoso Shuppan Kyokai, page 83, the image or picture quality of FIG. 1C will have a resolution approximating that for FIG. 1A. A second aspect of the invention is concerned with filling the vacancy of picture elements in the arrangement of FIG. 1C to obtain smooth and fine image quality. This will be detailed with reference to FIG. 2 showing an enlargement of the picture element arrangement shown in FIG. 1C. In the figure, picture elements assigned with digits (for example, digit 35 corresponds to a picture element D35 which is associated with coordinates, L=3 and P=5) designate real picture elements the image signal values for which are actually transmitted and coordinates vacant of digits designate imaginary picture elements the image signal values for which are not actually transmitted. In the first place, a vacancy, for example, imaginary picture element D43 is filled with an upper adjacent D33; obviously, it may be filled with a lower adjacent picture element, D53, holding the same effect. In the second place, the imaginary D43 is filled with a left adjacent D42; obviously, it may be filled with a right adjacent picture element i.e., D44. In the third place, the imaginary D43 is filled with upper and left adjacent picture elements D33 and D42 at a suitable ratio of addition of these elements; for this purpose, lower and right adjacent picture elements may obviously be replaced. Alternatively, a vacancy may be filled with some or all of upper, lower, right and left adjacent picture elements at a suitable ratio of addition of these elements. In this alternative, the vacancy may be filled with a subtraction of upper and lower adjacent picture elements or of right and left adjacent picture elements to enhance the vertical contour or the horizontal contour.

Figure 3:
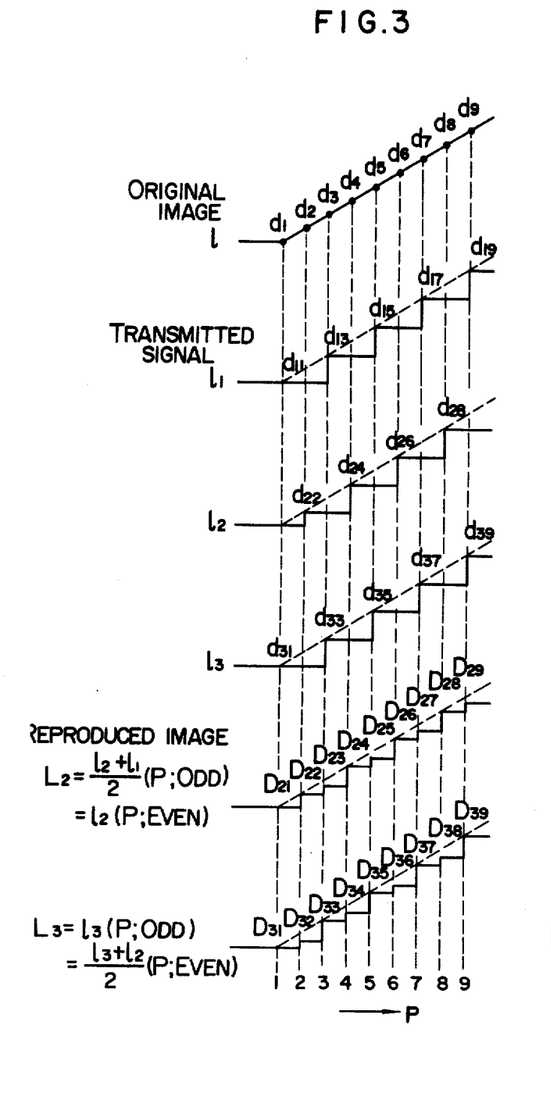
FIG. 3 is a graphical representation to explain the horizontal reproduction in accordance with the invertion.
Figure 4:
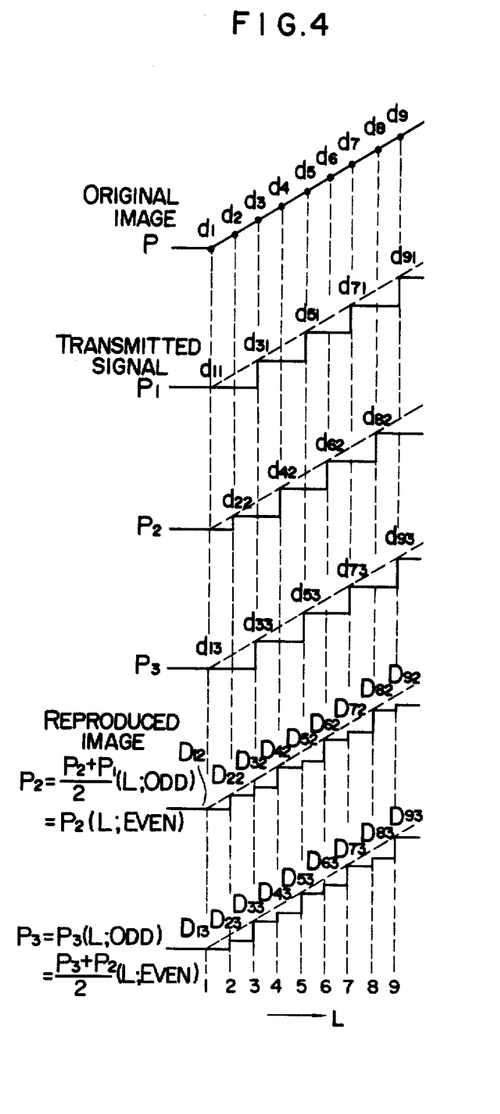
FIG. 4 is a graphical representation to explain the vertical reproduction in accordance with the invention.

Referring now to FIGS. 3 and 4, the smoothing effect obtainable when a vacancy is filled with upper and left adjacent picture elements at the same percentage will be described.

An original image as shown in FIG. 3 is a horizontal gray scale in which each line including picture elements $d_1$, $d_2$, $d_3$, - - - increases monotonously with respect to the horizontal picture element axis P. When transmitting this image, its signal includes odd lines (namely, corresponding to the odd field); $l_1$, $l_3$, $l_5$, - - - resulting from sampling odd picture elements $d_1$, $d_3$, $d_5$, - - - and even lines (namely, corresponding to the even field) $l_2$, $l_4$, $l_6$, - - - resulting from sampling even picture elements $d_2$, $d_4$, $d_6$, - - - . Consequently, line $l_1$ lacks gray scale values for imaginary elements $d_{12}$, $d_{14}$, - - - and line $l_2$ lacks gray scale values for imaginary elements $d_{21}$, $d_{23}$, - - - . A vacancy, for example, corresponding to imaginary picture element $d_{23}$, is filled with an addition of upper and left adjacent picture elements $d_{13}$ and $d_{22}$ at a ratio of 50% to form a picture element $D_{23}$, producing a reproduced line $L_2$ including elements $D_{21}$, $D_{22}$, $D_{23}$, - - - . Similarly, a reproduced line $L_3$ may include elements $D_{31}$, $D_{32}$, $D_{33}$, - - - . A reproduced image containing these reproduced lines $L_2$, $L_3$, - - - can be much more smooth and fine than would be produced with reproduced lines $l_2$, $l_3$, - - - which are not subjected to the interpolation for vacancies. In a similar manner, a smooth and fine image can be reproduced in the vertical direction, as will be seen from FIG. 4.

As described above, by combining the interleaved picture element arrangement with the picture element interpolation method, it is possible to reduce by half the number of picture elements to be transmitted and accordingly the capacity of memory and to ensure reduction by half in the transmission time, without impairing reproduced image quality obtainable from the picture element arrangement of the frame type. By referring to the aforementioned example, the number of memory cells is reduced to 4.5 M dots/sec × 1/30 sec/frame = 150 K dots/frame and the transmission time to (2.25 MHz/3 KHz × 1/30 sec)/frame ≈ 25 sec/frame.

Figure 5:
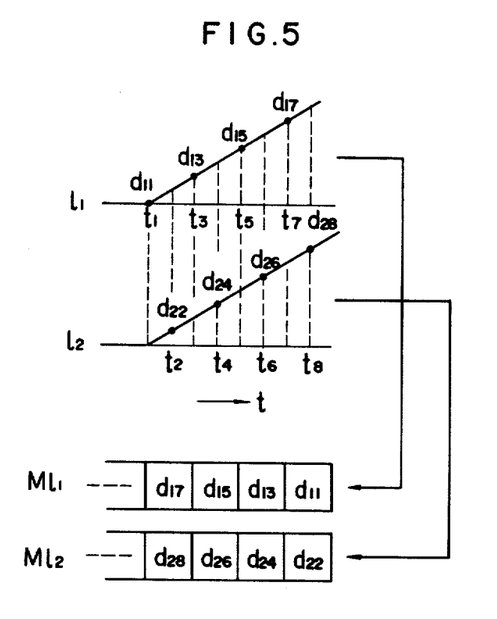
FIG. 5 is a diagrammatic representation showing a manner of video sampling in a transmitter and an arrangement written into memories in accordance with the invention.

The invention provides a method of receiving a video signal which attains the above advantages. To this end, according to one aspect of the invention, when a wide band video signal is stored in memories in a transmitter, even lines of the video signal that constitute an even field are stored into a memory by using writing-in clock signals having a phase shifted from the phase of writing-in clock signals employed for storing into another memory odd lines that constitute an odd field by half the period of the latter clock signals. Accordingly, if an odd line $l_1$ is sampled at picture elements $d_{11}$, $d_{13}$, $d_{15}$, - - - at timings $t_1$, $t_3$, $t_5$ - - - of the writing-in clock signals and written into a corresponding memory Ml$_1$, as shown in FIG. 5, an even line $l_2$ is sampled at picture elements $d_{22}$, $d_{24}$, $d_{26}$, - - - at intermediate timings $t_2$, $t_4$, $t_6$ - - - between the picture elements $d_{11}$, $d_{13}$, $d_{15}$, - - - on the odd line $l_1$ and written into a corresponding memory Ml$_2$. This storage of the picture elements may otherwise be accomplished by, for example, delaying the video signal odd line with respect to the video signal even line by half the period of clock signals by means of a delay line, a shift register or the like in advance of the writing-in operation and both the lines may be than written into the memories under the control of clock signals of the same phase.

The video signal thus stored is read out by clock signals at a low speed to be converted into a narrow band video signal which in turn is sent to a narrow band transmission line. In a receiver, on the other hand, a transmitted and received video signal is again stored in memories and thereafter read out by clock signals at a high rate to be converted into a wide band video signal. When performing the reading-out by the high rate clock signals, the phase of clock signals employed for reading out even lines of the video signal is shifted from the phase of clock signals for reading out odd lines by half the period of the latter clock signals. Thus, the operation as described with reference to FIG. 5 is carried out reversely so that a video signal may be obtained which contains an odd-line picture element arrangement interleaved with an even-line picture element arrangement. This video signal may otherwise be obtained by, for example, reading out the stored odd and even lines by clock signals of the same phase and thereafter delaying the even lines with respect to the odd lines by half the period of the reading out clock signals by means of a delay line, a shift register or the like. The wide band video signal thus obtained is displayed on a video monitor as an image of real picture elements (assigned with digits) as shown in FIG. 2.

According to a further aspect of the invention, when reading out a picture element on a odd (or even) line video signal, a picture element on an even (or odd) line video signal which is adjacent to the odd picture element in question is read out simultaneously, and the even picture element is so gated by clock signals for reading out the even line as to be added to the odd line. By this procedure, an imaginary picture element on the odd line can be interpolated by a picture element resulting from the addition of a real picture element on the odd line immediately before the imaginary element and the real picture element on the even line, thereby producing a display image which approximates an image in which vacancies or imaginary picture elements (not assigned with digits in FIG. 2) are filled with real picture elements.

Figure 6:
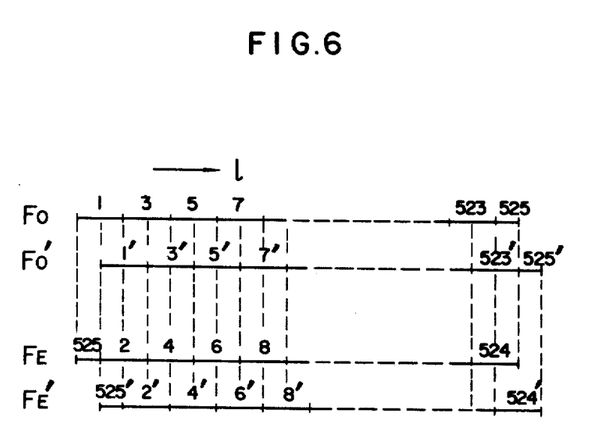
FIG. 6 is a diagrammatic representation to explain a timing correction in advance of a picture element interpolution operation in accordance with the invention.

Incidentally, when a video signal of a standard broadcasting system is employed wherein an odd number of lines are contained in one frame and the image takes a form of an interlaced arrangement establishing a phase difference of half the one line between odd line and even line, it is necessary to correct this phase difference for obtaining timings necessary to carry out the above interpolation for vacancies. According to a still further aspect of the invention, the timing of initiation of reading out the odd line or even line may be delayed by half the one line. Alternatively, a video signal resulting from reading out the odd line or even line may be delayed by half the one line through a delay line; or the timing of reading-out initiation may be delayed by half the one line by assigning the memory an address. FIG. 6 shows timing correction for the 525 line E1A standard broadcasting system. There are shown in the figure a signal $F_o'$ including odd lines $l_1'$, $l_3'$, $l_5'$, - - - which is delayed by half the one line with respect to a signal $F_o$ including odd lines $l_1$, $l_3$, $l_5$, - - - to constitute an odd field, and a signal $F_E'$ including even lines $l_2'$, $l_4'$, $l_6'$, - - - which is delayed by half the one line with respect a signal $F_E$ including even lines $l_2$, $l_4$, $l_6$, - - - to constitute an even field. It will be seen from a FIG. 6 that vacancies within line $l_2$ may be interpolated by real picture elements within line $l_1'$ and that vacancies within line $l_3$ may be interpolated by real picture elements within line $l_2'$.

The above-described principles will now be detailed by way of examples that embody the invention.

Figure 7:
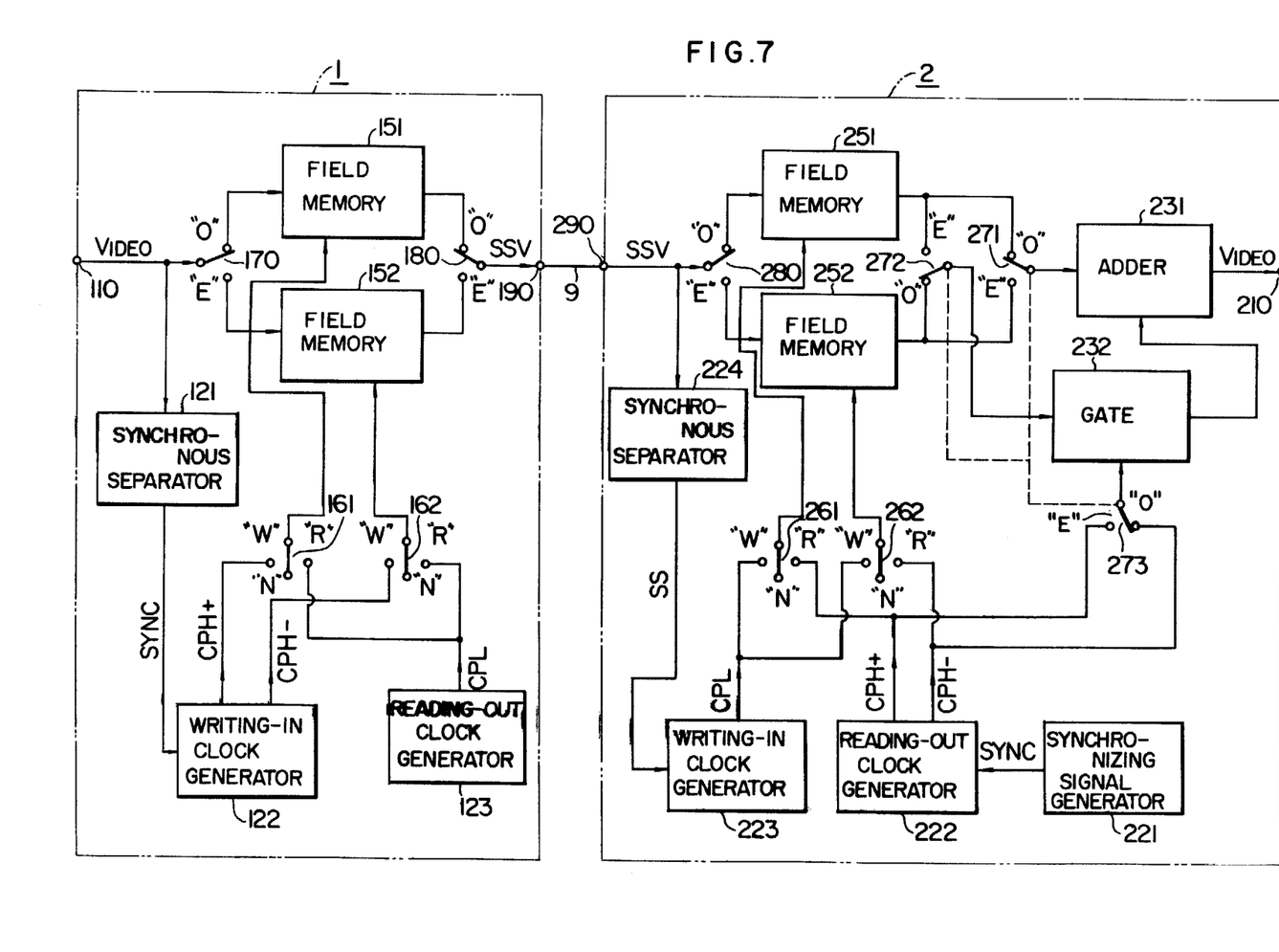
FIG. 7 is an electrical connection diagram of a first embodiment of the invention.

Referring to FIG. 7 showing a first embodiment of the invention, there are shown a transmitter 1, a narrow band transmission line 9, and a receiver 2. A wide band video signal VIDEO fed to an input terminal 110 of transmitter 1 is written into a field memory 151 via a contact "O" of a switch 170 during the period at which lines that constitute an odd field appear. The video signal is written into a field memory 152 via a contact "E" of switch 170 during the period at which lines that constitute an even field appear. Writing-in clock signals are produced in the following manner. The signal VIDEO is also converted into a synchronizing signal SYNC at a synchronous separator 121 and the synchronizing signal SYNC drives a writing-in clock generator 122. The clock generator 122 generates high rate (high frequency) writing-in clock signals CPH+ and high rate phase-inverting writing-in clock signals CPH−, the clock signals CPH+ and CPH− being phase locked with a line synchronizing signal contained in the signal SYNC through a phase lock loop. The clock signals CPH+ are fed to the memory 151 via a contact "W" of a switch 161 when writing-in the odd field lines, and the clock signals CPH− are fed to the memory 152 via a contact "W" of a switch 162 when writing-in the even field lines. The switches 161 and 162 are normally transferred to a neutral "N" to prevent the application of unnecessary clock signals to those memories. In this manner, the video signal can be written into the field memories 151 and 152 in the form of an arrangement of picture elements which are sampled by the writing-in clock signals.

After a writing-in operation of signal VIDEO for one frame has been completed, reading-out clock signals CPL generated by a reading-out clock generator 123 are fed to the memory 151 via a contact "R" of switch 161 for reading out the odd lines while fed to the memory 152 via a contact "R" of switch 162 for reading out the even lines. Read-out signals for odd lines and read-out signals for even lines are sent to an output terminal 190 via contacts "O" and "E" of a switch 180, respectively, and are transmitted, as a narrow band video signal SSV, to the narrow band transmission line 9. The rate (frequency) of the clock signals is selected to be so low that the transmission band of the transmission line 9 can cover the band allocated to the signal SSV. Cooperative transfer of the switches 161, 162, 170 and 180 is controlled by a system controller (not shown) in order to ensure that the above system operation is carried out smoothly.

In the receiver 2, the narrow band video signal SSV transmitted through the transmission line 9 and received at an input terminal 290 is stored in a field memory 251 via a contact "O" of a switch 280 if being for the odd field whereas it is stored in a field memory 252 via a contact "E" of the switch 280 if being for the even field. Writing-in operations are carried out by writing-in clock signals generating in the following manner. From the received signal SSV, a synchronous separator 224 produces picture element synchronizing signals SS which drive a clock generator 223 which produces writing-in clock signals CPL in synchronism with the signals SS. The clock signals CPL are fed to the memory 251 via a contact "W" of a switch 261 when the received signal SSV is for the odd field and to the memory 252 via a contact "W" of a switch 262 when the received signal SSV is for the even field. After the writing-in operation of the receiving signal SSV for one frame has been completed, those memories are read out under the control of reading-out clock signals which are generated in the following manner. A reading-out clock generator 222 generates high rate (high frequency) reading-out clock signals CPH+ and phase-inverting clock signals CPH−, both clock signals being phase locked with the line period of a synchronizing signal SYNC from a high rate synchronizing signal (equivalent to a synchronizing signal of the standard broadcasting system) generator 221. When reading out the odd field, the clock signals CPH+ are fed to the memory 251 via a contact "R" of the switch 261 and when reading out the even field, the clock signals CPH− are fed to the memory 252 via a contact "R" of the switch 262. A video signal thus read out is relayed to an adder 231 via a contact "O" of a switch 271 during the period of the odd field and via a contact "E" of the switch 271 during the period of the even field, and is taken out from the adder 231 as a wide band video signal VIDEO to be sent to an output terminal 210. With a video signal of the EIA standard broadcasting system, each of memories 251 and 252 have already been stored with picture elements associated with odd or even lines (hereinafter simply referred to as odd lines or even lines) in an arrangement of signals $F_o$ and $F_E$ shown in FIG. 6. When reproducing the odd field, the signal $F_o$ is read out from the memory 251 by the clock signals CPH+ and at the same time the signal $F_E'$, which is delayed by half the one line with respect to the signal $F_E$, is read out from the memory 252 by delaying the actuation of the switch 262 such that the timing of application of the lock signals CPH− to the memory 252 is delayed by half the one line. Consequently, lines $l_3$, $l_5$, - - - read out from the memory 251 are timed to lines $l_2'$, $l_4'$, - - - read out from the memory 252, respectively. If the memories are of random access memories that have the ability of addressing, similar line signals can be obtained by assigning the memory 252 an address that performs the reading-out operation delayed by half the one line with respect to the memory 251. Since picture elements associated with the signal $F_o$ are interlaced with those associated with the signal $F_E'$ by means of the phase difference between clock signals CPH+ and CPH−, the signal $F_E'$ relayed to a gate 232 via a contact "O" of a switch 272 may be gated at the gate 232 selectively driven by the clock signals CPH− via a contact "O" of a switch 273 and then added to the signal $F_o$ from the memory 251 at the adder 231, thereby interpolating a vacancy or imaginary picture element on the odd line by the left adjacent real picture element on the same line and the upper adjacent real picture element (on the even line). By transferring all of the switches 271, 272 and 273 to their contacts "E", the even field signal with interpolation for vacancies can be obtained similarly. Cooperative operation of the switches 261, 262, 271, 272, 273 and 280 and address assignment of the memories 251 and 252 is carried out under the control of control signals from a system controller (not shown) to ensure a smooth operation of the above system.

Figure 8:
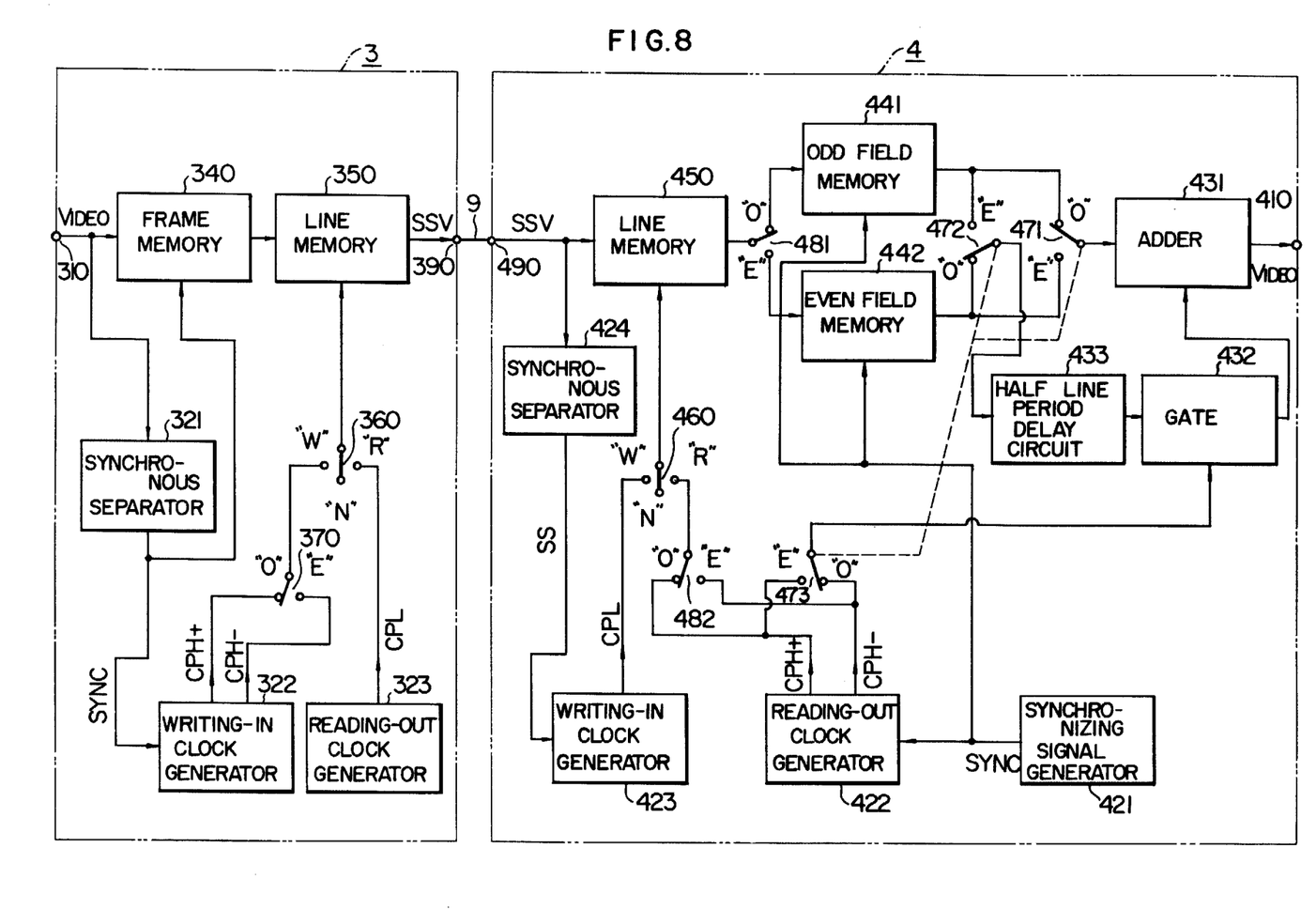
FIG. 8 is an electrical connection diagram of a second embodiment of the invention.

FIG. 8 shows a second embodiment of the invention, a similar operation to the first embodiment of which will be described briefly. In a transmitter 3, a wide band video signal VIDEO received at an input terminal 310 is sent to a frame memory 340 to be stored therein. The frame memory 340, for example, in the form of a disc memory of low cost per unit bit, is synchronously driven by a synchronizing signal SYNC separated from the signal VIDEO at a synchronous separator 321. The signal SYNC once written in the frame memory 340 is read out repeatedly at a period of one frame and fed to a line memory 350 which is controllable by clock signals. The video signal transferred at a high speed to the line memory 350 from the frame memory 340 in the order of every line unit is then read out at a low speed to be converted into a narrow band video signal SSV that is transmitted to a transmission line 9 via an output terminal 390. Clock signals applied to the line memory 350 manage this operation. More particularly, upon transfer, one of writing-in clock signals CPH+ and phase-inverting writing-in clock signals CPH− generated by a writing-in clock generator 322 in relation to the synchronizing signal SYNC separated from the signal VIDEO at the synchronous separator 321 is selected by a switch 370 and fed to the memory 350 via a contact "W" of a switch 360. Clock signals CPH+ or CPH− are fed to the memory 350 dependent on whether an odd or even line is to be transferred from the memory 340. After the transfer of one line has been completed, this line is read out by low speed reading-out clock signals CPL fed from a reading-out clock generator 323 via a contact "R" of the switch 360. Completion of the reading-out operation is followed by the transfer of the successive line. This repeated operation continues to complete the transmission of all the line signals for one frame video signal. Line signals stored in the line memory 350 will take, as shown in FIG. 5, an arrangement as represented by Ml$_1$ for odd lines and an arrangement as represented by Ml$_2$ for even lines.

In a receiver 4, the narrow band video signal SSV received at an input terminal 490 is stored in a line memory 450 line by line. After stored line signals, odd lines are read out at a high speed to be transferred to an odd field memory 441 via a contact "O" of a switch 481 while even lines being transferred to an even field memory 442 via a contact "E" of the switch 481. The field memories 441 and 442 in the form of a disc memory, for example, have discs synchronously rotated at a high speed by a synchronizing signal SYNC from a synchronizing signal generator 421 and addresses of line number allotted to rotational phases of the discs, which addresses are written in by given line number line by line. A series of system operations is carried out by cooperation of switches 460, 481 and 482. More particularly, a picture element synchronizing signal SS is separated from the signal SSV at a synchronous separator 424 and fed to a writing-in clock generator 423 to cause it to generate writing-in clock signals CPL in synchronism with the signal SS. When the signal SSV containing a line signal appears, the writing-in clock signals CPL are fed to the line memory 450 via contact "W" of the switch 460, storing the line in the memory 450. A reading-out clock generator 422, on the other hand, generates reading-out clock signals CPH+ and phase-inverting reading-out clock signals CPH− which are phase locked with line synchronizing signals of the high rate synchronizing signal SYNC. If the line signal now written in is of an odd line, it is transferred to the field memory 441 by the reading-out clock signals CPH+ applied to the memory 450 via contact "O" of the switch 482 and via contact "R" of the switch 460 which has transferred to contact "R" in synchronism with line signal transfer. If the line now written in is an even line, the reading-out clock signals CPH− are similarly fed to the line memory 450 via contact "E" of the switch 482 and contact "R" of the switch 460. At the termination of the reading-out operation, the switch 460 returns to "N", waiting for the successive line signal. This operation is repeated to complete writing-in of all the line signals for one frame to the field memories 441 and 442. Thereafter, these signals stored in these memories are relayed to an adder 431 by the synchronizing signal SYNC via contact "O" of a switch 471 during the period of odd field and via a contact "E" of the switch 471 during the period of even field, and transmitted, as a main signal corresponding to a wide band video signal VIDEO, to an output 410. The switch 472, on the other hand, selects its contact "O" during the period of odd field to cause the even line signal to be sent to a half line period delay unit 433 at which the even line signal is delayed by half the period of line. This delayed signal is gated at a gate 432 by the reading-out clock signals CPH− applied thereto via contact "O" of a switch 473 to produce an interpolation signal which is added to the main signal at the adder 431. During the period of even field, switches 471, 472 and 473 are transferred to their contacts "E", and the main signal and interpolation signal are exchanged. Thus, the signal VIDEO has its vacancy on a line interpolated by the left adjacent real picture element on the same line and the upper adjacent real picture element, as in the first embodiment. If the adder 431 is comprised of a resistor adder circuit and the gate 432 is operated in an on-off fashion, the addition ratio of the left and upper adjacent real picture elements can be determined by the percentage of input source impedance of the adder circuit.

Figure 9:
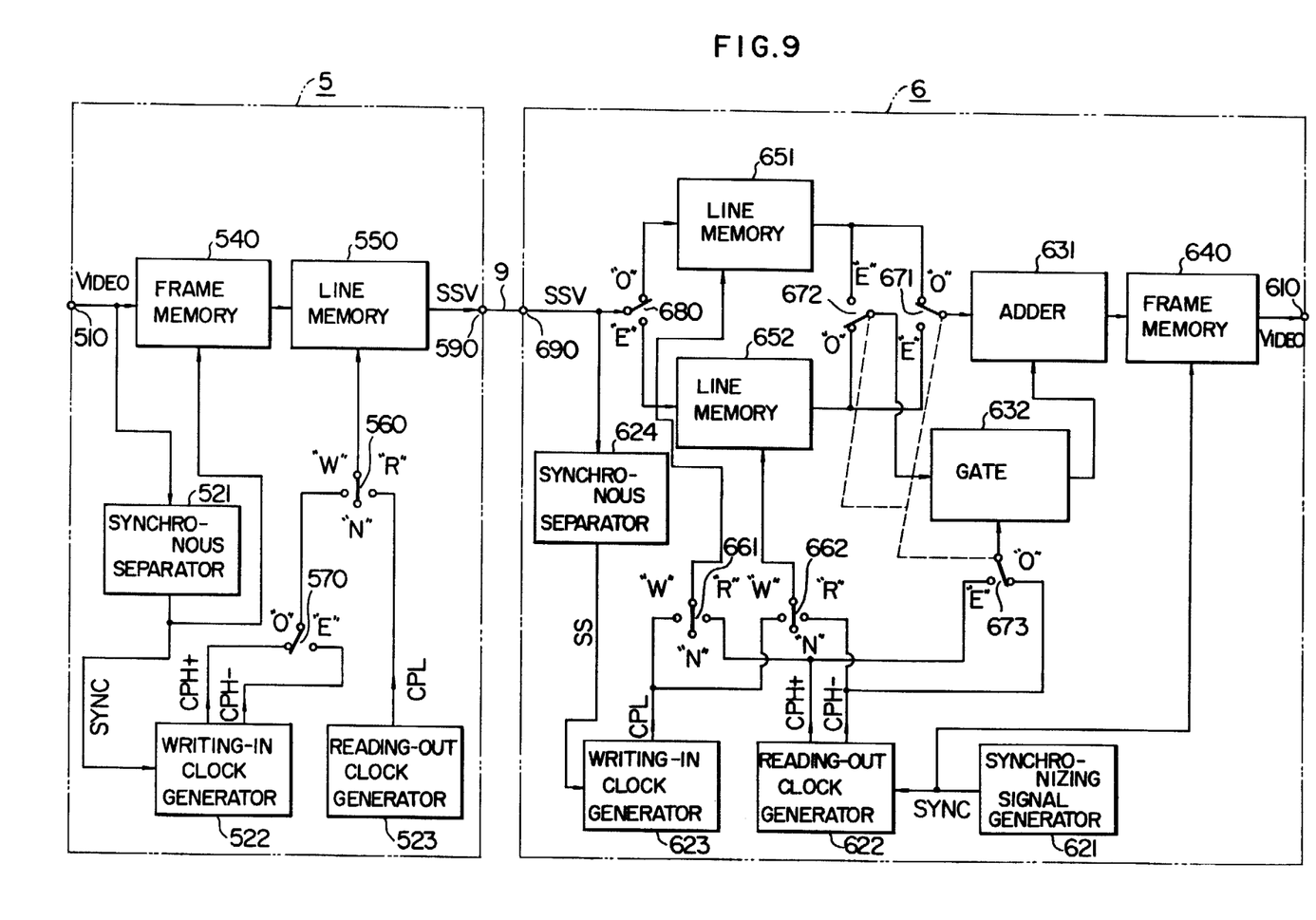
FIG. 9 is an electrical connection diagram of a third embodiment of the invention.

FIG. 9 shows a third embodiment of the invention which operates in a similar manner to the foregoing embodiments, except that a transmitter 5 having a similar construction to the transmitter 3 of the second embodiment delivers a narrow band video signal on the time base of the order of lines $l_1$, $l_2$, $l_3$, $l_4$, - - - . The second embodiment was not specifically related to a specified time base, the order of lines or the order of odd-even fields.

In a receiver 6, a signal SSV is received at an input terminal 690, an odd line $l_1$ of which is first written into a line memory 651 via a contact "O" of a switch 680. Subsequently, an even line $l_2$ is written into a line memory 652 via a contact "E" of the switch 680. For this purpose, writing-in clock signals CRL generated by a writing-in clock generator 623 in synchronism with a picture element synchronizing signal SS separated from the signal SSV at a synchronous separator 624 are fed to the memory 651 via a contact "W" of switch 661 and to the memory 652 via a contact "W" of switch 662. In synchronism with the timing of transfer of the line $l_1$ to a given address of a frame memory 640 following complation of the storage of lines $l_1$ and $l_2$ into memories 651 and 652, high rate reading-out clock signals CPH+ and phase-inverting clock signals CPH− generated at a reading-out clock generator 622 in synchronism with a high rate synchronizing signal SYNC from a synchronizing signal generator 621 are respectively fed to the line memory 651 via contact "R" of the switch 661 and to the line memory 652 via contact "R" of the switch 662 to read out threrfrom the stored line signals at a high speed. A signal representative of line $l_1$ from the line memory 651 is relayed, as a main signal, to an adder 631 via a contact "O" of a switch 671 whereas a signal representative of line $l_2$ from the line memory 652 is sent, as an interpolation signal, to the adder 631 via a contact "O" of a switch 672 and a gate 632. The main and interpolation signals added in the adder 631 are sent to a frame memory 640 which is a disc memory driven by the synchronizing signal SYNC. The gate 632 is gated by the reading-out clock signals CPH− applied via a contact "O" of a switch 673. Thus, a vacancy on the line $l_1$ can be interpolated by an additive signal of the left adjacent real picture element on the line $l_1$ and the lower adjacent real picture element on the line $l_2$. By transferring the switches 671, 672 and 673 from "O" to "E", the main signal and interpolation signal are exchanged to interpolate a vacancy on the line $l_2$ by the left adjacent real picture element on the same line and the upper adjacent real picture element on the line $l_1$.

Thereafter, the line memory 651 is reset and is ready for writing in the subsequent line $l_3$. After storage of the line $l_3$, the switches 671, 672 and 673 are transferred to their contacts "E" to read out the line $l_2$ as a main signal and the line $l_3$ as an interpolation signal which are added and transferred to the frame memory 640. This operation continues until all the lines for one frame have been written into the frame memory 640. A signal stored in the frame memory 640 is then read out to be transmitted, as a wide band video signal VIDEO, to an output terminal 610.

The third embodiment is advantageous in that half period delay means or address shift means is dispensed with since the interpolation for vacancy is carried out for each unit of line. The frame memory of this embodiment, however, treats the signal having been subjected to the interpolation and hence needs to be of a wide band.

As having been described, the invention can transmits the video signal through the narrow band transmission line based on the principle of dot interleaved arrangement to thereby decrease by half the number of the picture elements to be transmitted and accordingly the number of cells of the band conversion memory, together with reduction by half in the transmission time. In addition, the employment of the interpolation for vacancies or imaginary picture elements improves quality of the received and displayed image. Further, it is possible to reduce by half the maximum clock frequency for operating the band conversion memory, thereby eliminating various difficulties with the high speed processing, such as need of high speed switching elements and leakage of clock signals.

We claim:

1. In a method of receiving a video signal made up of picture elements the number of which is reduced by one-half transmitted with a narrow band frequency wherein the received video signals are first written as a narrow band frequency video signal into memories and are then read out therefrom at a higher reading-out speed than the writing-in speed so as to broaden the band allocation to the read-out signals, the improvement in which the timing of reading out odd lines corresponding to an odd field constituting one field of a display image of the video signal is shifted from the timing of reading out even lines corresponding to an even field constituting the other field of the same display image by a time substantially equal to half the reciprocal of the transmission wide band frequency which corresponds to the resolution limit for the reproduction of the image, said even lines being interlaced with said odd lines, and vacant picture elements included among said odd lines in said even lines being interpolated by means of adjacent real picture elements included among said odd lines and said even lines.

2. A video signal receiving method according to claim 1 wherein said odd lines are read out by first clock signals and said even lines are read out by second clock signals, said first and second clock signals having frequencies necessary to broaden the band of the read out video signal, said second clock signals being inverted in phase with respect to said first clock signals.

3. A video signal receiving method according to claim 1 wherein odd line signals read out from one memory are added to even line signals read out from the other memory, said even line being adjacent to said odd line.

4. A video signal receiving method according to claim 1, wherein the received video signals are read out alternately by first clock signals and second clock signals for each field.

5. A video signal receiving method according to claim 1, wherein said memories comprise two memories respectively storing the odd lines and the even lines.

6. A video signal receiving method according to claim 1, wherein the timing of reading out the odd lines corresponding to an odd field is shifted from the timing of reading out the even lines corresponding to an even field by a time substantially equal to the interval of the fields.

7. In a method of receiving a video signal transmitted with a narrow band frequency wherein the received video signals are first written into memories and are then read out therefrom at a reading-out speed higher than the writing-in speed to broaden the band frequency, the improvement in which the transmitted signals which are composed of half the number of image picture elements of an odd field and half the number of image picture elements of an even field of an original image picture are displayed as the display image provided with the image picture elements by means of interpolation for non-transmitted image picture elements using those odd field and even field transmitted picture elements which are adjacent said non-transmitted elements and thereby providing restoration of the non-transmitted image picture elements.

8. A video signal receiving method according to claim 7, wherein the timing of reading out odd lines corresponding to an odd field is shifted from the timing of reading out even lines corresponding to an even field by a time substantially equal to the interval of the fields.

9. A video display signal processing system comprising:

first means for receiving and storing first and second sets of video signals, said first set being comprised of video signals corresponding to selected ones of the image picture elements contained in the odd lines of image picture elements in an array of elements by way of which a complete video image is displayed, and said second set being comprised of video signals corresponding to selected ones of the image picture elements contained in the even lines of image picture elements in said arrays;

second means, coupled to said first means, for reading out said first and second sets of video signals from said first means and causing said first and second sets to be transmitted over a narrow band communication link;

third means, coupled to said narrow band communication link, for storing said first and second sets of video signals; and fourth means, coupled to said third means, for reading said first and second sets of video signals out of said third means in such a manner that a reconstructed video output signal is produced, said reconstructed video output signal containing respective video signal components to be applied to each of the picture elements in the picture element array by way of which said complete video image is displayed; and wherein said fourth means includes means for reading out said first set of video signals from said third means at a timing that is shifted from the timing of reading out said second set of video signal from said third means by a time differential substantially equal to half the reciprocal of the transmission wide band frequency that corresponds to the resolution limit for the production of said reconstructed image by way of said array of display picture elements.

10. A video display signal processing system according to claim 9, wherein the selected ones of the image picture elements contained in said odd and even lines constitute half the picture elements of said array.

11. A video display signal processing system according to claim 9, wherein said first and second sets of video signals respectively correspond to the odd and even fields of said video image, and said third means includes first and second memories for storing said first and second sets of video signals, respectively.

12. A video display signal processing system according to claim 11, wherein said fourth means includes means for controlling the reading out of said first and second sets of video signals from said first and second memories in accordance with first and second clock signals, respectively.

13. A video display signal processing system according to claim 12, wherein said fourth means includes means for simultaneously reading out video signals of said first set from said first memory and video signals of said second set from said second memory and combining said simultaneously-read out video signals to produce video signal components corresponding to the non-selected ones of the image picture elements of the array of elements by way of which the reconstructed image is produced.

14. A video display signal processing system according to claim 13, wherein the line locations of the selected ones of the image picture elements of said odd lines respectively correspond to the line locations of the non-selected image picture elements of said even lines, and the line locations of the selected ones of the image picture elements of said even lines respectively correspond to the line locations of the non-selected ones of the image picture elements of said odd lines.

15. A video display signal processing system according to claim 14, wherein said fourth means includes means for combining the video signal component for an even line corresponding to the line location of a non-selected image picture element in the adjacent odd line with the video signal component for a selected image picture element at the line location immediately adjacent the non-selected image picture element in said odd line, to thereby produce a video signal output component to be applied to that image picture element of the array for producing the reconstructed image which corresponds to said non-selected image picture element in said adjacent odd line.

16. A video display signal processing system according to claim 14, wherein said fourth means includes means for combining the video signal component for an odd line corresponding to the line location of a non-selected image picture element in the adjacent even line with the video signal component for a selected image picture element at the line location immediately adjacent the non-selected image picture element in said line, to thereby produce a video signal output component to be applied to that image picture element of the array for producing the reconstructed image which corresponds to said non-selected image picture element in said adjacent even line.

17. A video display signal processing system according to claim 15, wherein said fourth means includes means for combining the video signal component for an odd line corresponding to the line location of a non-selected image picture element in the adjacent even line with the video signal component for a selected image picture element at the line location immediately adjacent the non-selected image picture element in said even line, to thereby produce a video signal output component to be applied to that image picture element of the array for producing the reconstructed image which corresponds to said non-selected image picture element in said adjacent even line.

* * * * *